Figure 1:
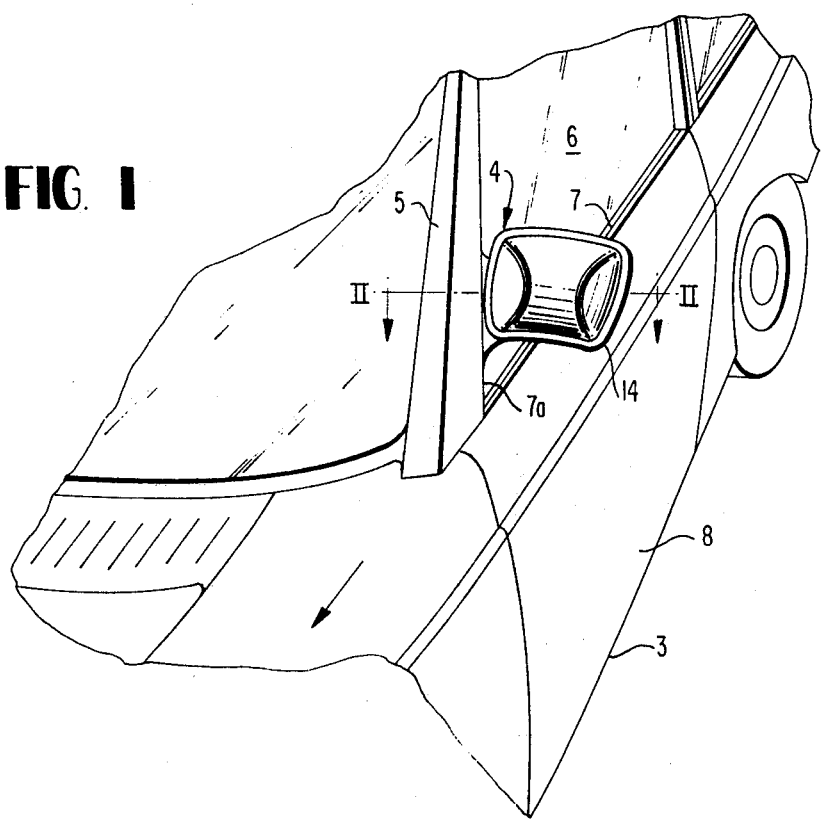

United States Patent [19]
Gotz

[11] 3,990,774
[45] Nov. 9, 1976

[54] OUTSIDE MIRROR FOR MOTOR VEHICLES

[75] Inventor: Hans Gotz, Sindelfingen, Germany

[73] Assignee: Daimler-Benz Aktiengesellschaft, Germany

[22] Filed: June 28, 1971

[21] Appl. No.: 157,392

[30] Foreign Application Priority Data
June 29, 1970 Germany.............................. 2032018

[52] U.S. Cl. ................................................. 350/61
[51] Int. Cl.² ......................... G02B 5/08; G02B 7/18
[58] Field of Search ........ 248/475 A, 475 B, 475 R; 350/61, 307; 296/154; 49/476

[56] References Cited
UNITED STATES PATENTS

| 1,401,942 | 12/1921 | Benzer | 350/307 |
|---|---|---|---|
| 1,447,902 | 3/1923 | Sell | 350/307 UX |
| 1,467,350 | 9/1923 | Abbott | 350/307 |
| 1,771,061 | 7/1930 | Rice | 350/307 X |
| 2,029,978 | 2/1936 | Andrews | 296/154 |
| 2,326,316 | 8/1943 | Allen | 350/307 X |
| 2,478,161 | 8/1949 | Russell | 296/154 |

FOREIGN PATENTS OR APPLICATIONS

| 1,101,026 | 1/1968 | United Kingdom | 248/475 R |

*Primary Examiner*—William H. Schultz
*Attorney, Agent, or Firm*—Craig & Antonelli

[57] ABSTRACT

A motor vehicle outside mirror which includes a housing secured at the body of the vehicle and a mirror plate adjustably arranged within the housing; the outer surface of the housing has the shape of a paraboloid with a vertex directed forwardly in the driving direction while the rear boundary of the mirror housing is disposed in one plane that forms an acute angle, preferably deviating only slightly from a right angle, with respect to the vertical vehicle longitudinal plane.

13 Claims, 2 Drawing Figures

U.S. Patent  Nov. 9, 1976  3,990,774

INVENTOR
HANS GÖTZ

BY Craig, Antonelli & Hill
ATTORNEYS

OUTSIDE MIRROR FOR MOTOR VEHICLES

The present invention relates to a motor vehicle-outside mirror with a housing secured at the body of the motor vehicle and with a mirror plate adjustably arranged within the housing.

The purpose of the present invention is to keep as clean as possible from soiling the side windows and mirror surfaces of outside mirrors.

The clear visibility through the side windows of motor vehicles as well as the image produced in the outer rear view mirror are strongly impaired by impinging rain water, however, above all by dirty water. The dirtied water which results on the window panes, in addition from the direct impingement thereon, from the dirt stemming from the road surface or which is formed by the dust layer separated from surfaces of the vehicle by the impinging rain water, is forcibly displaced toward the side during the drive partially from the windshield by the centrifuging movement of the turned-on windshield wipers and partially by the air flow due to aerodynamic pressure flowing or sweeping over the windshield in a lateral direction and is dammed up predominantly at the lower windshield corner, from where the aerodynamic pressure sprays the dirtied water over the side windowpane and over the forward housing surface of the rear view mirror. The dirt particles thereby adhere at the side windows or are torn off from the enclosure edge of the rear view mirror housing and are deposited on the mirror plate surface due to the existing turbulence.

The aim of the present invention essentially resides in eliminating the impediments and impairments of the driving ability of the driver to which he is exposed by reason of the lacking visibility and viewing ability due to the soiling of the side window and of the mirror surface. It has been discovered as effective solution to the present invention that the purposes of this invention can be effectively achieved if the outer surface of the housing which at the same time forms the mirror base, has the form of a paraboloid with a forwardly directed vertex and the rear boundary of the mirror housing is disposed in a plane which extends to the vertical vehicle longitudinal plane at an acute angle $\alpha$, preferably deviating only slightly from a right angle.

Advantageously, the periphery of the housing is provided with an edge projecting forwardly and forming a channel about the entire housing, which edge is provided with a drain at the outermost lower corner of the mirror housing. The air stream containing the soiled water can be deflected only slightly by the aerodynamically favorable form of the mirror housing; additionally, the soiled water deposited on the housing body is reliably guided and conducted by the paraboloidal shape into the water-collecting channel formed by the forwardly directed circumferential edge and the housing, whereas, on the other hand, the air stream flows off behind the mirror without soiling the mirror surface, properly speaking.

By the use of the edge in conjunction with the housing shape, the dirtied water conducted from the windshield toward the side or thrown up from the ground or by the wheels can be thrust rearwardly from the mirror enclosure by the air stream due to the aerodynamic pressure without disturbance and at a sufficient distance from the vehicle without coming in contact with the side windows. The detachment of the air stream from the mirror enclosure edge takes place at a sufficient distance from the mirror plate so that the latter generally remains free of any dirt film since dirt deposits cannot occur on the same.

The reduction of the height of the circumferential edge at the outer lower area of the mirror housing up to the housing itself represents a further advantage of the present invention. As a result thereof, the soiled water collected in the water collecting channel can flow off at this place in the downward direction and is carried off toward the rear by the air stream outside of the vehicle side windows.

Accordingly, it is an object of the present invention to provide a motor vehicle rear view mirror which avoids by simple means the aforementioned shortcomings and drawbacks encountered in the prior art.

Another object of the present invention resides in a motor vehicle rear view mirror which minimizes soiling under all driving conditions.

A further object of the present invention resides in an outside rear view mirror for motor vehicles which is so connected with the vehicle and is of such shape as to minimize the impairment of the visibility through the side windows and by way of the mirror plate.

A still further object of the present invention resides in an outside rear view mirror for motor vehicles which assures good visibility to the driver at all times by way of the mirror.

Figure 2:
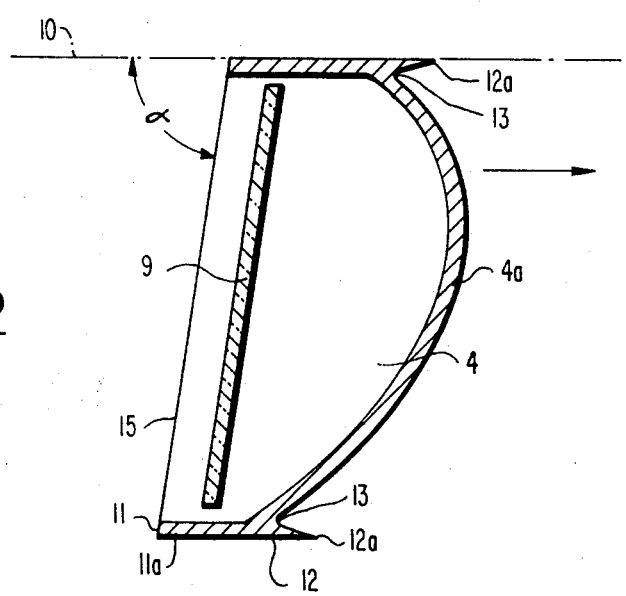

These and other objects, features and advantages of the present invention will become more obvious from the following description when taken in connection with the accompanying drawing which shows, for purposes of illustration only, one embodiment in accordance with the present invention, and wheren:

FIG. 1 is a partial perspective view, taken from in front, of a portion of the left side of a passenger motor vehicle equipped with an outside mirror in accordance with the present invention; and FIG. 2 is a horizontal cross-section through the outside mirror taken along line II—II of FIG. 1.

Referring now to the drawing wherein like reference numerals are used throughout the two views to designate like parts, the manner of securing and the particular configuration of the rear view mirror 4 at the left windshield column 5 of the vehicle assures a good view in the area of the left rear side of the motor vehicle 3 (FIG. 1) and of the lateral rear road portion. In order to prevent an impairment of the visibility for the driver through the near side window 6 due to dirtied water or, in case of rain, due to water precipitation, connected with dirt deposits, especially within the area of the visibility essential for that purpose to the driver, approximately at the height of the eyes of the driver, in the field of vision above the window ledge or above the lower window ledge 7, the rear view mirror 4 is so secured at the windshield column 5 within the lower area, approximately at the height of the window ledge 7, that the driver door 8 does not come in contact with the outside mirror 4 even with the largest door opening angle and with a pivoted out windowpane 6 in case of a pivotal side window.

The mirror can be adapted to the different height and seat position of a respective driver of different heights by pivoting the mirror plate 9 by conventional means. The parts of the mirror necessary for the adjustment thereof are not illustrated since they are conventional and form no part of the present invention. In lieu of being secured at the windshield column 5, the rear mirror 4 may also be securely arranged at the forward lower corner 7a of the window frame of the driver door 8 in order not to impair the opening width of the driver door 8.

The mirror housing body 4a is so secured at the windshield column 5 that the rear boundary 15 (FIG. 2) of the mirror housing 4a and therewith of the rear edge 11 thereof is disposed in a single plane which forms an acute angle α, preferably deviating only slightly from a right angle to the vertical vehicle longitudinal plane 10 (FIG. 2).

The body shape of the mirror housing 4a is constructed as paraboloid whose focus is displaced slightly toward the vehicle, i.e., the paraboloidal shell portion near the vehicle is somewhat shorter than the outer paraboloidal shell portion.

The edge 11 of the mirror housing body 4a is constructed essentially rectangularly in cross-section similar to shape of the mirror plate 9. The outer surface 11a of the edge 11 extends parallel to the vertical longitudinal plane 10.

In order to protect the view on the mirror surface 9 against impinging rain water or against soiled water thrown toward the side from the windshield or thrown up by the wheels or to further conduct such soiled water rapidly, the housing body 4a is provided with a forwardly projecting edge portion 12 in addition to the fastening of the rear view mirror 4 at the indicated places and of the special construction of the housing body 4a. The edge portion 12 is the extension of the edge 11 constructed in one piece therewith. The mirror housing body 4a is securely connected with the windshield column 5 at its straight, narrow side of greater length as viewed in FIG. 2. The edge portion 12 tapers conically in the forward direction so that it has the shape of a narrow wedge. A groove or channel 13 results therefrom between the paraboloidal body 4a and the edge portion 12, in which collects water carried off by the air stream due to aerodynamic pressure, above all soiled water displaced from the windshield or thrown up from the wheels. The trapezoidal shape of the edge 11 can be slightly displaced downwardly toward the outer corner 14 so that the water collected from all edge sides can flow toward this corner which then represents the lowest point in the channel 13.

For the elimination of collecting water in the channel 13, the edge portion 12 is reduced in length in the direction toward the outer lower trapezoidal corner 14, up to the height of the mirror housing body 4, i.e., substantially completely disappears within the area of outer corner 14 so that the channel 13 forms thereat a water drain disposed far outwardly, through which the dirty water can flow off continuously. The emptying operation is assisted by the air stream due to the aerodynamic pressure flowing past the same which enhances the discharge.

A covering of the mirror plate 9 as also a soiling of the side window 6 within the area to the rear of the rear view mirror 4 is prevented by the drainage of the soiled water at the outer corner 14 and by the guidance of the air jet separated from the remaining air stream by the edge portion 12 and guided by the enclosure edge 11.

While I have shown and described only one embodiment in accordance with the present invention, it is understood that the same is not limited thereto but is susceptible of numerous change and modifications as known to those skilled in the art, and I therefore do not wish to be limited to the details shown and described herein, but intend to cover all such changes and modifications as are encompassed by the scope of the appended claims.

What is claimed is:

1. A motor vehicle outside mirror with a housing means secured at a part of a vehicle body and provided with a mirror adjustably arranged therein, wherein the outer surface of the housing means has the shape of approximately a paraboloid opening to the rear of the vehicle and the rear terminus of the housing is disposed in a plane which with a vertically extending plane disposed parallel to the longitudinal axis of the vehicle subtends an acute angle opening to the rear of the vehicle, and means disposed around the periphery of said housing means for collecting water deposited thereon.

2. A motor vehicle outside mirror according to claim 1, characterized in that said angle deviates only slightly from a right angle.

3. A motor vehicle outside mirror according to claim 1, characterized in that said housing means forms simultaneously the mirror base.

4. A motor vehicle outside mirror with a housing means secured at a part of the vehicle body and provided with a mirror means adjustably arranged therein, characterized in that the outer surface of the housing means has the shape approximately of a paraboloid with a vertex directed forwardly in the driving direction and the rear boundary of the housing means is disposed in a plane which forms an acute angle with a vertically extending plane disposed parallel to the longitudinal axis of the vehicle, said acute angle deviates only slightly from a right angle, said housing means forms simultaneously the mirror base, and in that the periphery of the housing means is provided with a forwardly projecting edge means forming a channel about the entire housing means, said channel being provided with drainage means.

5. A motor vehicle outside mirror according to claim 4, characterized in that the drainage means is constituted by a reduction of the length of the edge means.

6. A motor vehicle outside mirror according to claim 5, characterized in that the drainage means is provided in the lower outer corner of the mirror housing means.

7. A motor vehicle outside mirror according to claim 6, characterized in that the wall thickness of the edge means is reduced conically in the driving direction of a vehicle whereas its peripheral outer surface extends substantially parallel to the driving direction of a vehicle.

8. A motor vehicle outside mirror with a housing means secured at a part of the vehicle body and provided with a mirror means adjustably arranged therein, characterized in that the outer surface of the housing means has the shape approximately of a paraboloid with a vertex directed forwardly in the driving direction and the rear boundary of the housing means is disposed in a plane which forms an acute angle with a vertically extending plane disposed parallel to the longitudinal axis of the vehicle, and in that the periphery of the housing means is provided with a forwardly projecting edge means forming a channel about the entire housing means, said channel being provided with drainage means.

9. A motor vehicle outside mirror according to claim 8, characterized in that the drainage means is constituted by a reduction of the length of the edge means.

10. A motor vehicle outside mirror according to claim 8, characterized in that the drainage means is provided in the lower outer corner of the mirror housing means.

11. A motor vehicle outside mirror according to claim 8, characterized in that the wall thickness of the edge means is reduced conically in the driving direction of a vehicle whereas its peripheral outer surface extends substantially parallel to the driving direction of a vehicle.

12. A motor vehicle outside mirror as recited in claim 1, wherein said means for collecting is provided with a means for draining the water collected.

13. A motor vehicle outside mirror as recited in claim 1, wherein said means for collecting consists of forwardly projecting edges on said housing means forming a channel thereabout.

* * * * *

UNITED STATES PATENT OFFICE
CERTIFICATE OF CORRECTION

Patent No. 3,990,774  Dated November 9, 1976

Inventor(s) Hans GOTZ

It is certified that error appears in the above-identified patent and that said Letters Patent are hereby corrected as shown below:

As it presently reads:

[30]  Foreign Application Priority Data

June 29, 1970 Germany.................2032018

As it should read:

[30]  Foreign Application Priority Data

June 29, 1970 Germany..............2032019.8

Signed and Sealed this

Twenty-first Day of June 1977

[SEAL]

Attest:

RUTH C. MASON
*Attesting Officer*

C. MARSHALL DANN
*Commissioner of Patents and Trademarks*